United States Patent
Kucera et al.

(10) Patent No.: US 8,590,739 B2
(45) Date of Patent: Nov. 26, 2013

(54) METHOD FOR OPERATING A PNEUMATIC DEVICE FOR THE METERED DELIVERY OF A LIQUID AND PNEUMATIC DEVICE

(75) Inventors: Ladislav Kucera, Thalwil (CH); Martin Von Arx, Unteraegeri (CH)

(73) Assignee: Unaxis International Trading Ltd, Cham (CH)

( * ) Notice: Subject to any disclaimer, the term of this patent is extended or adjusted under 35 U.S.C. 154(b) by 1858 days.

(21) Appl. No.: 11/402,703

(22) Filed: Apr. 11, 2006

(65) Prior Publication Data

US 2006/0225786 A1 Oct. 12, 2006

(30) Foreign Application Priority Data

Apr. 11, 2005 (CH) ........................................ 654/05

(51) Int. Cl.
*B67D 7/28* (2010.01)
(52) U.S. Cl.
USPC .................................. 222/1; 222/61; 222/399
(58) Field of Classification Search
USPC ........................... 222/1, 52, 55, 61, 394, 399
See application file for complete search history.

(56) References Cited

U.S. PATENT DOCUMENTS

| | | |
|---|---|---|
| 3,708,088 A | 1/1973 | Lesher |
| 4,989,756 A | 2/1991 | Kagamihara et al. |
| 5,031,805 A | 7/1991 | Rohmann |
| 5,199,607 A | 4/1993 | Shimano |
| 5,277,333 A | 1/1994 | Shimano |
| 5,878,957 A | 3/1999 | Takado et al. |
| 8,136,707 B2 * | 3/2012 | Vidal ............................ 222/639 |

FOREIGN PATENT DOCUMENTS

| | | | |
|---|---|---|---|
| EP | 0 979 028 | | 2/2000 |
| EP | 1 432 013 | | 6/2004 |
| WO | WO 2005/036294 | * | 4/2005 |

\* cited by examiner

*Primary Examiner* — J. Casimer Jacyna
(74) *Attorney, Agent, or Firm* — Nixon Peabody LLP

(57) ABSTRACT

The invention concerns the operation of a pneumatic device for the metered delivery of a liquid and a pneumatic device particularly suited for operation in accordance with the invention. The pneumatic device has a pressure tank that can be connected to a compressed air source by means of an inlet valve and with the surroundings by means of an outlet valve. For delivery of the liquid, a pressure pulse is applied to the liquid container containing the liquid in that the pressure tank is temporarily connected to the liquid container via a changeover valve. After the end of the pressure pulse, the pressure prevailing in the pressure tank is increased to a value that is greater than the set value to be achieved during the pressure pulse.

6 Claims, 3 Drawing Sheets

Figure 1:
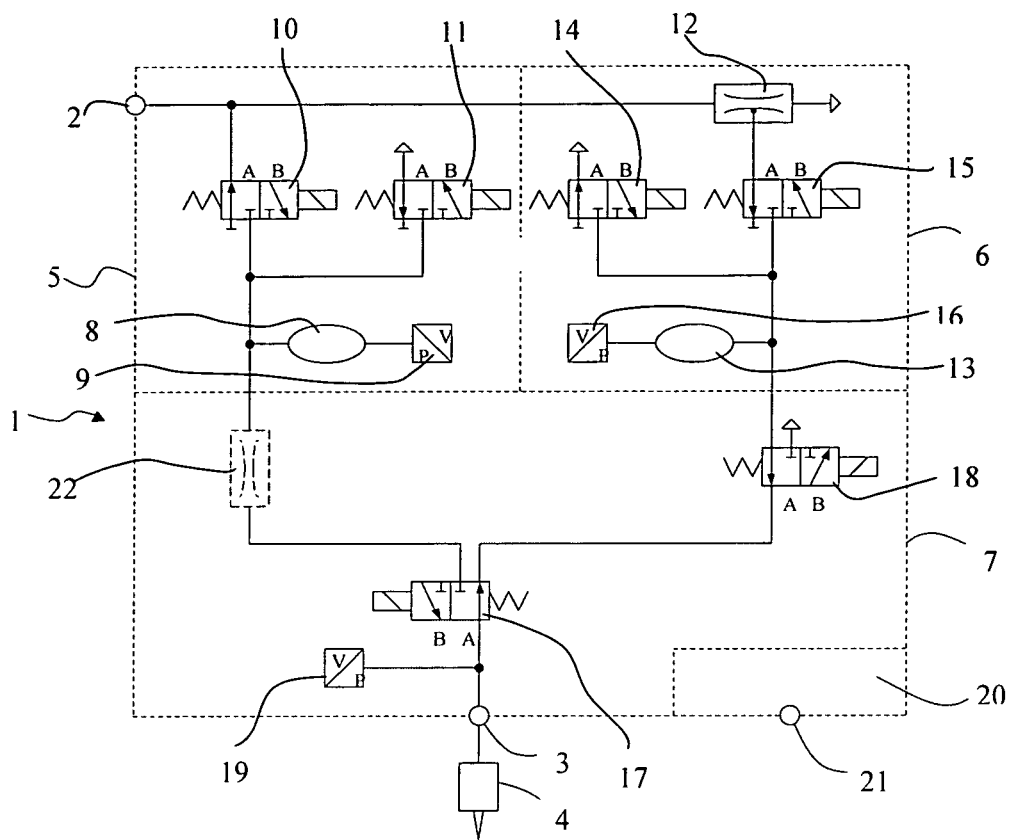

METHOD FOR OPERATING A PNEUMATIC DEVICE FOR THE METERED DELIVERY OF A LIQUID AND PNEUMATIC DEVICE

PRIORITY CLAIM

Applicant hereby claims foreign priority under 35 U.S.C §119 from Swiss Application No. 654/05 filed Apr. 11, 2005, the disclosure of which is herein incorporated by reference.

FIELD OF THE INVENTION

The invention concerns a method for operating a pneumatic device for the metered delivery of a liquid as well as a pneumatic device that is used particularly when mounting semiconductor chips onto a substrate in order to apply a predetermined amount of adhesive to the substrate.

BACKGROUND OF THE INVENTION

Such a pneumatic device is suited for the metered delivery of viscous, sticky or chemically aggressive liquids. Compared with a mechanical pump, it has the advantage that it is subjected to little wear and can be more easily cleaned. However, it has the disadvantage that the amount of liquid delivered is not determined volumetrically as is the case for example with the mechanical pump described in the European patent application EP 979028. The term "metered delivery" means that each time a predetermined amount or portion of liquid is delivered.

With the mounting of semiconductor chips, epoxy based adhesives are often used that contain flakes of silver. The adhesive is located in a syringe to which pressure pulses from the pneumatic device are applied in order to eject the adhesive in portions. Application of the adhesive is done either by means of a dispenser nozzle that has several openings through which the adhesive exudes and is deposited on the substrate, or by means of a writing nozzle that has one single opening through which the adhesive exudes. The writing nozzle is guided along a predetermined path by means of a drive system that can be moved in two horizontal directions so that the deposited adhesive forms a predetermined adhesive pattern on the substrate. A semiconductor mounting apparatus with a writing nozzle that can be moved in two horizontal directions is known for example from EP 1432013. Delivery of the adhesive is done in that the pneumatic device produces a pressure pulse that lasts just as long as the writing movement of the writing nozzle. Pneumatic devices are known from the patent specifications U.S. Pat. No. 5,199,607 and U.S. Pat. No. 5,277,333 that can be used for this application. These devices contain a pressure tank the pressure level of which is regulated by a pressure regulator. These devices have two significant disadvantages:

The amount of liquid delivered is dependent on the degree of emptying of the syringe. In order to keep the amount of delivered liquid constant, the length of the pressure pulse is varied. This hampers the co-ordination with the writing movement of the writing nozzle.

The pressure level of the pressure pulse changes during delivery of the liquid as the pressure regulator wants to compensate the pressure loss occurring in the pressure tank at the beginning of the pressure pulse.

SUMMARY OF THE INVENTION

The object of the invention is to develop a pneumatic device and/or a method for operating such a pneumatic device without the above named disadvantages.

A pneumatic device for the metered delivery of a liquid comprises a pressure tank that can be connected to a compressed air source via a first valve and to the surroundings via a second valve, as well as a pressure sensor that measures the pressure prevailing in the pressure tank and the output signal of which is used to adjust or regulate the pressure prevailing in the pressure tank by means of the two valves. Furthermore, the pneumatic device includes a vacuum tank that, at least during longer time pauses between the pressure pulses, is connected to the container containing the liquid in order to prevent the liquid from running out or dripping. In order to deliver liquid, the liquid container is temporarily connected to the pressure tank, i.e. a pressure pulse is applied to the liquid container. An important requirement is that the pressure level in the liquid container is as constant as possible during the pressure pulse. On the one hand, the invention concerns the operation of such a pneumatic device. The method of operation in accordance with the invention is characterised in that the pressure $p_T$ prevailing in the pressure tank after the end of a pressure pulse is increased to a pressure level $p_{T2}$ that is greater than a pressure level $p_{B1}$ to be maintained during the pressure pulse. Therefore in order to apply a pressure pulse to the liquid container for delivery of a portion of liquid the liquid container is temporarily connected to the pressure tank. After disconnecting the liquid container from the pressure tank the pressure $p_T$ prevailing in the pressure tank is increased to a pressure level $p_{T2}$ that is greater than the pressure level $p_{B1}$. With this, the following behaviour results: At the beginning of a pressure pulse, the pressure $p_T$ in the pressure tank lowers while a pressure $p_C$ in the liquid container increases until the pressure $p_T$ in the pressure tank and the pressure $p_C$ in the liquid container are the same and achieve an essentially constant pressure level. The pressure level $p_{T2}$ is selected so that the pressure $p_C$ in the liquid container—in the statistical average—achieves the desired set value $p_{B1}$. Operation in accordance with the invention is possible with a pneumatic device with which the pressure $p_T$ prevailing in the pressure tank is constantly regulated as well as with a pneumatic device with which the pressure regulation of the pressure $p_T$ prevailing in the pressure tank is switched off during delivery of the liquid, i.e. for the duration of a pressure pulse. Therefore, in accordance with the invention, with a pneumatic device with which the pressure $p_T$ prevailing in the pressure tank is constantly regulated, for the duration of the pressure pulse the pressure is regulated to the value $p_{B1}$ and during the pauses between the pressure pulses to the value $p_{T2}$. However, the invention can be particularly well implemented with a pneumatic device with which the pressure $p_T$ prevailing in the pressure tank after the end of a pressure pulse is increased to the value $p_{T2}$ and with which the pressure $p_T$ prevailing in the pressure tank during the delivery of the liquid, i.e. for the duration of a pressure pulse, is neither regulated nor adjusted. So the pressure in the pressure tank assumes the value $p_{T2}$ each time before the next pressure pulse is applied to the liquid container.

Operation in accordance with the invention can be improved by means of further, optional measures. First namely in that the pressure sensor measures a pressure level $p_{C1}$ achieved after pressure build-up and that the pressure level $p_{T2}$ in the pressure tank before the start of the next pressure pulse is adjusted so that the next time (or in the statistical average) the pressure level $p_{C1}$ achieves the predetermined set value $p_{B1}$. A change in the pressure level $p_{C1}$ as a result of emptying the liquid container is therefore prevented. A second measure that comes to use as an alternative to the first measure, consists in measuring the progression of the pressure in the liquid container (or at the output of the pneumatic device) during the pressure pulse, calculating the time integral of the pressure and then adjusting the pressure level $p_{T2}$ to be achieved in the pressure tank before the start of the next pressure pulse so that the time integral of the pressure remains constant in the statistical average. With a pneumatic device with which the pressure prevailing in the pressure tank is not regulated but set, a third measure exists in that each time after conclusion of the pressure pulse, a higher pressure than the desired pressure is first produced in the pressure tank and then the pressure is reduced to the desired value. In this way, the accuracy of the pressure level to be set in the pressure tank can be increased especially with a comparatively low pressure level.

The invention therefore concerns on the one hand the operation of a pneumatic device for the metered delivery of a liquid, whereby the pneumatic device has a pressure tank that can be connected to a compressed air source by means of an inlet valve and to the surroundings by means of an outlet valve, whereby for the delivery of liquid the pressure tank is temporarily connected to a liquid container containing the liquid via a changeover valve, whereby before delivery of liquid the pressure in the pressure tank is increased to a value that is greater than the set value to be maintained during the delivery of liquid.

In addition, it is preferable to measure the pressure level $p_{C1}$ that arises towards the end of liquid delivery in the pressure tank or in the connection line between the pressure tank and the liquid container or in the liquid container and to determine and adjust a set value for the pressure to be achieved in the pressure tank before the next delivery of liquid under consideration of the measured pressure level $p_{C1}$ so that during continuous operation the pressure level $p_{C1}$ achieves in the statistical average the same value.

In particular, the pressure level $p_C(t)$ at the liquid container is preferably measured as a function of time t and the integral $$\int_{t_1}^{t_2} g(p_B(t))p_B(t)dt$$

calculated, whereby the pressure level $p_C(t)$ at time $t_1$ exceeds a first predetermined threshold value and at time $t_2$ falls below a second predetermined threshold value and whereby the function $g(p_C)$ is a given weighting function, and a set value for the pressure $p_{T2}$ to be achieved in the pressure tank before the next delivery of liquid is determined and adjusted under consideration of the integral so that in continuous operation the integral achieves in the statistical average the same value.

On the other hand, the invention concerns a pneumatic device that comprises a pressure tank, a first inlet valve that is arranged between the pressure tank and a compressed air source, a first outlet valve that is arranged between the pressure tank and the surroundings, a vacuum tank, a second inlet valve that is arranged between the vacuum tank and the surroundings, a second outlet valve that is arranged between the vacuum tank and a vacuum source, a first changeover valve that is arranged between the pressure tank and an output of the pneumatic device, and a control device that is programmed so that the first inlet valve interrupts the connection between the pressure tank and the compressed air source and the first outlet valve interrupts the connection between the pressure tank and the surroundings while, in terms of pressure, the first changeover valve connects the pressure tank to the liquid container.

With such a pneumatic device, on conclusion of delivery of the liquid the pressure level in the pressure tank is preferably set in that the pressure tank is first connected to the compressed air source by means of the inlet valve and is then connected to the surroundings by means of the outlet valve so that the pressure first increases above the set value and is then lowered to the set value.

The pneumatic device preferably comprises a second changeover valve that is arranged between the first changeover valve and the vacuum tank.

In order to avoid pressure reflections, a throttle is preferably arranged between the pressure tank and the first changeover valve.

In the following, the invention is explained in more detail based on an embodiment of the pneumatic device and based on the drawing.

BRIEF DESCRIPTION OF THE DRAWING FIGURES

Figure 2:
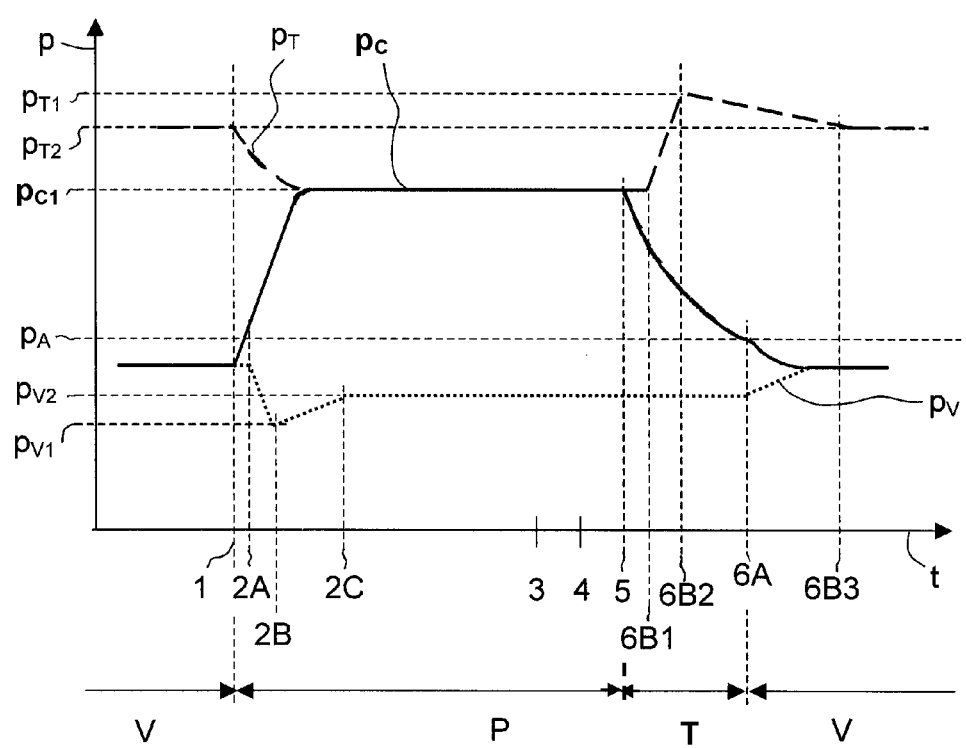
Figure 3:
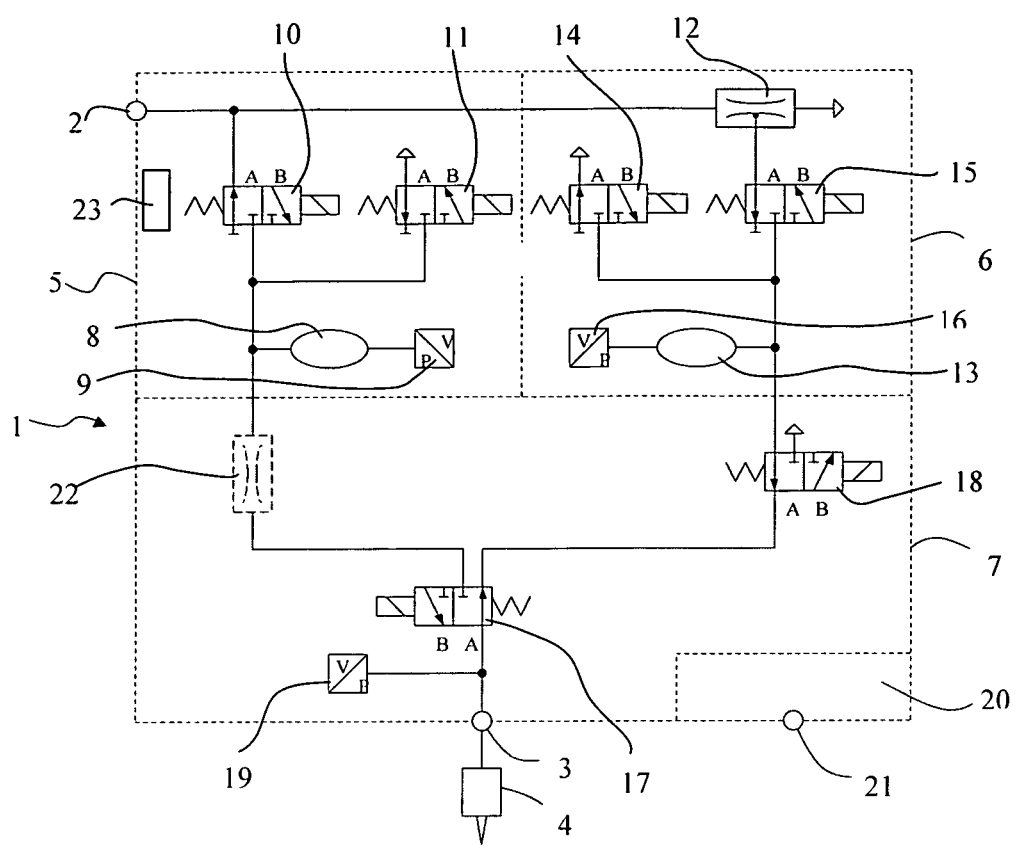

The accompanying drawings, which are incorporated into and constitute a part of this specification, illustrate one or more embodiments of the present invention and, together with the detailed description, serve to explain the principles and implementations of the invention. The figures are not to scale. In the drawings:

FIG. 1 shows a schematic plan of a pneumatic device in accordance with the invention, and FIG. 2 shows time curves of different pressures, and FIG. 3 shows the pneumatic device according to FIG. 1 that is extended with a pressure regulator.

DETAILED DESCRIPTION OF THE INVENTION

FIG. 1 shows a schematic view of a pneumatic device in accordance with the invention 1 for the metered delivery of a liquid that is particularly suited for carrying out the method in accordance with the invention explained above. The device 1 includes an input 2 for the supply of compressed air that is produced by an external compressed air source, and an output 3 that is connected to the liquid container 4 via a tube. The device 1 consists of three pneumatic sub-groups 5-7 that fulfil three sub-functions. The first sub-group 5 produces the upper pressure level that is required for delivery of the liquid. The second sub-group 6 produces the holding vacuum that is to prevent the liquid from dripping. The third sub-group 7 controls delivery of the liquid.

The first sub-group 5 comprises a pressure tank 8, a first pressure sensor 9 for measuring the pressure $p_T$ prevailing in the pressure tank 8, an inlet valve 10 for building up the pressure and an outlet valve 11 for reducing the pressure in the pressure tank 8. The inlet valve 10 connects the pressure tank 8 to the input 2. The outlet valve 11 connects the pressure tank 8 with the surrounding air. The first sub-group 5 further comprises drivers for controlling the valves 10 and 11 as well as an evaluation circuit for evaluating the output signal delivered by the pressure sensor 9.

The second sub-group 6 comprises a venturi nozzle 12 that is connected to the input 2 and therefore supplied with compressed air for producing a vacuum, a vacuum tank 13, an inlet valve 14 for reducing the vacuum and an outlet valve 15 for increasing the vacuum in the vacuum tank 13 and a pressure sensor 16 for measuring the vacuum or underpressure in the vacuum tank 13. The inlet valve 14 connects the vacuum tank 13 with the surrounding air. The outlet valve 15 connects the vacuum tank 13 to the venturi nozzle 12. The second sub-group 6 further comprises drivers for controlling the valves 14 and 15, as well as an evaluation circuit for evaluating the output signal delivered by the second pressure sensor 16.

The third sub-group 7 comprises a first changeover valve 17 that connects either the pressure tank 8 or the vacuum tank 13 with the outlet 3 of the pneumatic device 1, a second changeover valve 18 that is arranged between the first changeover valve 17 and the vacuum tank 13 and which enables reduction of the pressure in the liquid container 4 via the surrounding air, as well as a third pressure sensor 19 that is arranged either at the output 3 or in the liquid container 4. The third sub-group 7 also comprises drivers for controlling the two changeover valves 17 and 18 as well as an evaluation circuit for evaluating the output signal delivered by the third pressure sensor 19.

The valves 10, 11, 14, 15, 17 and 18 are characterised by the following features:

They are valves with only two valve positions A and B that, on failure of the power supply, assume a predetermined valve position, namely the valve position designated in FIG. 1 as position A.

They are quick-acting or high speed valves that have a switching time of between two and at most around four milliseconds.

A control device 20 controls the pneumatic device 1. The control device 20 contains an interface 21 so that operation of the pneumatic device 1 can be controlled from a master instance. The pneumatic device in accordance with the invention 1 was developed for use on an automatic assembly machine for the mounting of semiconductor chips in order to apply adhesive to the substrate. The automatic assembly machine comprises a dispensing station where the adhesive is applied to the substrate and a bonding station where the semiconductor chips are placed onto the substrate. The dispensing station contains a dispensing nozzle or a moveable writing nozzle. During application of the adhesive, the dispensing nozzle remains stationary, the writing nozzle carries out a writing movement. The liquid container 4 with the adhesive is either arranged stationary on the dispensing station or is mounted on a writing head that moves the writing nozzle over the substrate. An output of the liquid container 4 is connected directly or via a tube to the dispensing nozzle or the writing nozzle. The output 3 of the pneumatic device 1 is connected to the liquid container 4 via a tube. The automatic assembly machine is controlled by a computer that transmits the data necessary for operation of the pneumatic device 1 to the control device 20 via the interface 21.

The pneumatic device 1 consists of the named three sub-groups 5-7. The two changeover valves 17 and 18 are placed as close as possible to the liquid container 4. For reasons of space, the first sub-group 5 with the pressure tank 8 and the second sub-group 6 with the vacuum tank 13 are installed at some distance away from the two changeover valves 17 and 18. This decentralised construction of the pneumatic device 1 can lead to undesirable pressure waves caused by reflections occurring in the connecting line between the pressure tank 8 and the first changeover valve 17. For this reason, it is advantageous to integrate a throttle 22 into the connection line close to the pressure tank 8 in order to prevent reflections at the pressure tank 8. By definition, the throttle 22 is a taper in the connection line the necessary degree of which can best be determined empirically.

The pneumatic device 1 is constructed so that on a failure of the power supply all valves, with the exception of the second changeover valve 18, assume the position A while the second changeover valve 18 first assumes the position B and only assumes the position A after expiry of a predetermined time duration in order that any overpressure in the liquid container 4 is first reduced to the surroundings before the liquid container 4 is connected to the vacuum tank 13.

In addition, the control device 20 can be programmed so that it detects when the pressure in the pressure tank 8 or the vacuum in the vacuum tank 13 cannot be built up which suggests a failure of the pressure supply and that it then moves all valves into the position A so that even on a failure of the pressure supply no liquid can run out whereby however as before the second changeover valve 18 first assumes the position B and only assumes the position A after a predetermined time duration has expired.

The pneumatic device 1 can assume two conditions V and P. In condition V, it supplies the output 3 with holding vacuum, in condition P it supplies the output 3 with compressed air. In the following, a cycle is described that begins with the change from condition V to condition P, i.e. the cycle begins on application of a pressure pulse. In condition V, the valves 10, 11, 14, 15, 17 and 18 are in the position designated in FIG. 1 as valve position A. The signal to change is transmitted at the proper time from the computer of the automatic assembly machine to the control device 20 whereupon the following steps are carried out:

1. The changeover valve 17 changes from the position A to the position B: In terms of pressure, the liquid container 4 is now connected to the pressure tank 8 so that the pressure $p_C$ in the liquid container 4 increases and achieves an almost constant pressure level $p_{C1}$.

The vacuum tank 13 is now decoupled from the liquid container 4 and can be prepared for the next action. At the end of a pressure pulse, the pressure in the vacuum tank 13 increases a little each time as the air to be discharged from the liquid container 4 flows only into the vacuum tank 13 but is not discharged via the venturi nozzle 12. The vacuum tank 13 is therefore emptied as follows:

2A. The outlet valve 15 changes from the position A to the position B: In terms of pressure, the vacuum tank 13 is now connected to the venturi nozzle 12 so that the vacuum in the vacuum tank 13 again increases.

2B. As soon as the output signal from the second pressure sensor 16 indicates that the vacuum has reached a predetermined value $p_{V1}$, the outlet valve 15 changes from the position B back into the position A. Afterwards, the inlet valve 14 changes from the position A to the position B: In terms of pressure, the vacuum tank 13 is now connected with the surroundings so that the vacuum in the vacuum tank 13 again reduces.

2C. As soon as the output signal from the second pressure sensor 16 indicates that the vacuum in the vacuum tank 13 has achieved a predetermined value $p_{V2}$, the inlet valve 14 changes from the position B to the position A.

In the vacuum tank 13 a vacuum now prevails the pressure of which has the pressure level $p_{V2}$.

As soon as the given time duration for the pressure pulse has expired, the pneumatic device 1 changes from condition P to condition V:

3. Before the change, the pressure level in the pressure tank 8 is measured by the first pressure sensor 9 and stored as value $p_{C1}$.

4. The second changeover valve 18 changes from the position A to the position B. This step is a preparatory step that can also be carried out earlier, e.g. immediately after step 1.

5. The first changeover valve 17 changes from the position B to the position A: The connection between the liquid container 4 and the pressure tank 8 is interrupted. Because the second changeover valve 18 is in the position B, in terms of pressure the liquid container 4 is now connected with the surroundings. The overpressure prevailing in the liquid container 4 is therefore reduced without loading the vacuum tank 13.

The staggering of steps 4 and 5 guarantees that, independently of switching delays of the two changeover valves 17 and 18 caused by tolerances, the liquid container is not briefly connected to the vacuum tank 13 before the overpressure is reduced.

The condition P is now concluded and a transition phase T follows that continues until the pressure in the liquid container 4 is reduced to the pressure prevailing in the surroundings.

In the liquid container 4, increase of the holding vacuum takes place and simultaneously the pressure tank 8 is prepared for delivery of the next pressure pulse.

The pressure $p_C$ prevailing at the output 3 is monitored by the third pressure sensor 19.

6A. As soon as the output signal of the pressure sensor 19 indicates that the pressure $p_C$ has lowered to almost the level of the pressure in the surroundings, the second changeover valve 18 changes from the position B to the position A. The liquid container 4 is now connected to the vacuum tank 13. The pressure in the liquid container 4 therefore reduces to almost the pressure prevailing in the vacuum tank 13.

6B1. The inlet valve 10 changes from the position A to the position B: Compressed air is now supplied to the pressure tank 8. The pressure $p_T$ prevailing in the pressure tank is continuously measured by the first pressure sensor 9. A soon as the output signal of the pressure sensor 9 indicates that the pressure $p_T$ has reached a predetermined value $p_{T1}$, the inlet valve 10 changes from the position B back to the position A.

6B2. The outlet valve 11 changes from the position A to the position B: In terms of pressure, the pressure tank 8 is now connected with the surroundings so that the pressure $p_{PT}$ again reduces.

6B3. As soon as the output signal of the pressure sensor 9 indicates that the pressure has reached a predetermined value $p_{T2}$, the outlet valve 11 changes from the position B back to the position A. The pressure level $p_{T2}$ now prevails in the pressure tank 8. Dependent on the value $p_{C1}$ measured in step 3, the value $p_{T2}$ is preferably set as $P_{T2}=p_{C1}+\Delta p$, whereby the value $\Delta p$ is determined by the control device 20 so that the pressure level $p_{C1}$ achieves the predetermined set value $p_{B1}$.

The pneumatic device 1 is now in condition V and is ready for delivery of the next pressure pulse.

The explained process steps 1 to 6B3 define the optimum operation of the pneumatic device 1. The most important factor with operation in accordance with the invention is that the two valves 10 and 11 are in and remain in the position A when the pneumatic device 1 is in condition P so that the pressure in the pressure tank 8 is not re-adjusted during the pressure pulse. The steps 2B, 2C, 3, 6B2 and 6B3 could be omitted. The pneumatic devices according to U.S. Pat. No. 5,199,607 or U.S. Pat. No. 5,277,333 quoted in the introduction can be operated according to the method of operation in accordance with the invention when the pressure regulation for the pressure tank is switched off during the pressure pulse. However, apart from this measure their operation can be further improved. This will be explained further below.

Setting the vacuum in the vacuum tank 13 can also be done in different ways, in particular, the vacuum in the vacuum tank 13 could be constantly regulated. The pressure reduction in the liquid container 4 at the end of a pressure pulse could also be done in a different way.

FIG. 2 shows the time curve of the pressure $p_V$ prevailing in the vacuum tank 13, the pressure $p_T$ prevailing in the pressure tank 8 and the pressure prevailing in the liquid container 4 achieved during operation in accordance with the steps explained above. The curves are not presented to scale in order to clearly illustrate the facts. The steps 1 to 6B3 of the operating method explained above are also entered on the time axis t. The pressure $p_A$ designates the atmospheric pressure prevailing in the surroundings. From this FIG. 2 it can be seen that the pressure in the pressure tank 8 reduces at the start of a pressure pulse because the volume is increased by the dead volume of the liquid container 4 and the connection line. On conclusion of the pressure pulse, the pressure in the pressure tank 8 therefore has to be built up again.

The device in accordance with the invention has the following advantages:

The pressure level $p_{C1}$ arising in the liquid container 4 remains constant as the pressure in the pressure tank 8 is not re-adjusted during delivery of the pressure pulse.

The pressure level $p_{T2}$ that is built up in the pressure tank 8 before delivery of the next pressure pulse is independent of pressure fluctuations of the compressed air source.

The two-stage method for building up the pressure in the pressure tank 8 described in the steps 6B1 and 6B2 enables an accurate setting of the pressure level $p_{T2}$, particularly with a low pressure level $p_{T2}$, because with a low pressure level $p_{T2}$ to be set, the pressure in step 6B1 increases relatively quickly as the pressure difference is large, the pressure in step 6B2 reduces relatively slowly because then the pressure difference is small.

Each valve is only switched twice per cycle, namely from the position A to the position B and back again to the position A.

On failure of the power supply, all valves go into the position A. In terms of pressure, the vacuum tank 13 is separated from the venturi nozzle 12 as well as from the surroundings but is connected to the liquid container 4. This therefore prevents the liquid from running out. In terms of pressure, the pressure tank 8 is also separated from the compressed air source and from the surroundings.

It can happen that the shape of the pressure pulse changes during emptying of the liquid container 4. With it, the amount of liquid delivered per pressure pulse also changes. For this reason, it is advantageous to measure the course of the pressure $p_C$ at the output 3 of the pneumatic device 1 with the third pressure sensor 19 and to calculate the integral $$I_n = \int_{t_1}^{t_2} p_B(t)dt$$

for each pressure pulse, whereby the time $t_1$ designates the time at which the pressure $p_C(t)$ exceeds a predetermined threshold value and the time $t_2$ designates the time at which the pressure $p_C(t)$ falls below the same threshold value or a different predetermined threshold value, and whereby the index n serves the numbering of the pressure pulses. The threshold value is predetermined so that the integral $I_n$ is as proportional as possible to the delivered amount of liquid. Alternatively, the integral can also be formed weighted with a weighting function $g_C(p_B)$ as $$I_n = \int_{t_1}^{t_2} g(p_B(t)) p_B(t) dt,$$

whereby the weighting function $g(p_C)$ models the dependency of the flow velocity of the liquid on the currently prevailing pressure $p_C$. The weighting function $g(p_C)$ has for example the form $g(p_C)=g_0+g_1{}^*p_C$, whereby $g_0$ and $g_1$ are constants. The calculated integral $I_n$ is then used in order to re-adjust the pressure level $p_{T2}$ in the pressure tank 8 so that the integral $I_{n+1}$ of the next pressure pulse is the same size: $I_{n+1}=I_n$. In step 6B3, the pressure level is then for example set to the value $$p_{T2} = p_{B1} * \frac{I_n}{I_{n+1}} + \Delta p.$$

Alternatively, the pulse duration could also be extended by the factor $$\frac{I_n}{I_{n+1}}.$$

This adjustment that is only described in principle here but which is preferably carried out in practice according to generally accepted statistical methods so that the integral achieves the same value in the statistical average, ensures that the amount of liquid delivered per pressure pulse is independent of the degree of emptying of the liquid container 4.

As can be seen in FIG. 2, as soon as the changeover valve 17 is moved from the position A to the position B in step 1, the pressure $p_C$ in the liquid container 4 increases to the value $p_{C1}$. At the same time, the pressure $p_T$ prevailing in the pressure tank 8 sinks from the start value $p_{T2}$ to the value $p_{C1}$. As soon as the pressure in the liquid container 4 has reached the value $p_{C1}$, it remains almost constant as the dead volume only increases insignificantly on delivery of the liquid. The pressure level $p_{C1}$ corresponds to the set pressure level $p_{B1}$ to be maintained during delivery of the liquid. In principle, whether or not the set pressure level is re-adjusted during the phase from step 1 up to step 5 is not significant. The invention can therefore also be implemented with a pneumatic device with which the pressure $p_T$ prevailing in the pressure tank 8 is constantly regulated, for example with a pneumatic device in accordance with U.S. Pat. No. 5,199,607 or U.S. Pat. No. 5,277,333 or the pneumatic device in accordance with FIG. 3 that is extended with a pressure regulator 23. The control device 20 gives the pressure regulator 23 the set value for the pressure to be regulated and the pressure regulator 23 controls the inlet valve 10 and the outlet valve 11. Operation with permanent pressure regulation of the pressure $p_T$ takes place as follows:

1. The pneumatic device is in condition V, i.e. the liquid container 4 is supplied with the holding vacuum. In accordance with the invention, the pressure $p_T$ prevailing in the pressure tank 8 is now regulated to a pressure level $p_{T2}$ that is greater than the set pressure level $p_{B1}$ to be maintained during delivery of the liquid.
2. For delivery of the liquid, the liquid container 4 is connected to the pressure tank 8; with the device in accordance with FIG. 3 by changing the changeover valve 17 from the position A to the position B. The pneumatic device is now in condition P.
3. The set value for the pressure regulator 23 that regulates the pressure prevailing in the pressure tank 8 is lowered from the value $p_{T2}$ to the value $p_{B1}$.
4. In order to conclude the delivery of liquid, the liquid container 4 is separated from the pressure tank 8; with the device in accordance with FIG. 3 by changing the changeover valve 17 from the position B to the position A.
5. The set value for the pressure regulator 23 that regulates the pressure prevailing in the pressure tank 8 is again increased from the value $p_{B1}$ to the value $p_{T2}$.

With this operating mode therefore, in principle the pressure $p_T$ prevailing in the pressure tank 8 is regulated to the value $p_{T2}$ while the liquid container 4 is separated from the pressure tank 8 and regulated to the value $p_{B1}$ while the liquid container 4 is connected to the pressure tank 8. However, it should be noted that the time at which the set value for the pressure regulator 23 is reduced from the value $p_{T2}$ to the value $p_{B1}$ can also lie somewhat before or after the time at which the liquid container 4 is connected to the pressure tank 8 so that the set value $p_{B1}$ at the start of delivery of the liquid is achieved in an optimum manner, i.e. as quickly as possible and without overshooting, i.e. unwanted oscillations.

With increasing emptying of the liquid container 4, the pressure level $p_{T2}$ increases and therefore also the difference $\Delta p=p_{T2}-p_{B1}$. It is therefore advantageous in a calibration step to first determine the pressure level $p_{T2e}$ that has to be assumed when the liquid container 4 is empty and to calculate the difference $\Delta p_e=p_{T2e}-p_{B1}$ from this and then to monitor the pressure difference $\Delta p$ in production and to produce an alarm signal when the pressure difference $\Delta p$ has reached a predetermined level $k^*\Delta p_e$ or $k^*(\Delta p_e=\Delta p_f)$ whereby the parameter k is less than 1, for example k=0.8, and whereby $\Delta p_f$ designates the pressure difference that has to be assumed when the liquid container 4 is full and to produce a stop signal at the latest when the pressure difference $\Delta p$ has achieved the value $\Delta p_e$.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims and their equivalents.

What is claimed is:

1. A method for operating a pneumatic device for metering the delivery of portions of a liquid from a liquid container containing the liquid, the method comprising:
   setting a pressure in a pressure tank to an initial pressure level that is greater than a pressure level $p_{B1}$ to be achieved in the liquid container during delivery of a portion of liquid, and
   performing repeatedly the following steps for delivering one portion of liquid after the other:
   delivering a portion of liquid by temporarily coupling the liquid container to the pressure tank in order to apply a pressure pulse to the liquid container, and
   after the liquid container has been decoupled from the pressure tank, increasing the pressure in the pressure tank to a pressure level $p_{T2}$ that is greater than the pressure level $p_{B1}$,
   wherein the pressure tank is couplable to a compressed air source by means of an inlet valve and to the surroundings by means of an outlet valve, wherein the inlet valve keeps the coupling between the pressure tank and the compressed air source interrupted and the outlet valve keeps the coupling between the pressure tank and the surroundings interrupted while the pressure tank is coupled to the liquid container.

2. The method according to claim 1, further comprising measuring a pressure level $p_{C1}$ achieved in or close to the liquid container before the liquid container is decoupled from the pressure tank, and adjusting the pressure level p such that the pressure level $p_{C1}$ has as its statistical average the same value as the pressure level $p_{B1}$.

3. The method according to claim 1, wherein a pressure level $p_C(t)$ is measured in or close to the liquid container as a function of time t and the integral $$\int_{t_1}^{t_2} g(p_B(t))p_B(t)dt$$

calculated, wherein the pressure level $p_C(t)$ at time $t_1$ exceeds a first predetermined threshold value and at time $t_2$ falls below a second predetermined threshold value, and wherein the function $g(p_C)$ is a given weighting function, and wherein the pressure level $p_{T2}$ is adjusted such that the integral achieves in the statistical average the same value.

4. The method according to claim 1, wherein the pressure level in the pressure tank is set to the pressure level $p_{T2}$ by the steps:
   coupling the pressure tank to the compressed air source by means of the inlet valve in order to increase the pressure in the pressure tank above the pressure level $p_{T2}$,
   decoupling the pressure tank from the compressed air source,
   coupling the pressure tank with the surroundings by means of the outlet valve, and
   decoupling the pressure tank from the surroundings when the pressure level has reached its set value $p_{T2}$.

5. The method according to claim 2, wherein the pressure level in the pressure tank is set to the pressure level $p_{T2}$ by the steps:
   coupling the pressure tank to the compressed air source by means of the inlet valve in order to increase the pressure in the pressure tank above the pressure level $p_{T2}$,
   decoupling the pressure tank from the compressed air source,
   coupling the pressure tank with the surroundings by means of the outlet valve, and
   decoupling the pressure tank from the surroundings when the pressure level has reached its set value $p_{T2}$.

6. The method according to claim 3, wherein the pressure level in the pressure tank is set to the pressure level $p_{T2}$ by the steps:
   coupling the pressure tank to the compressed air source by means of the inlet valve in order to increase the pressure in the pressure tank above the pressure level $p_{T2}$,
   decoupling the pressure tank from the compressed air source,
   coupling the pressure tank with the surroundings by means of the outlet valve, and
   decoupling the pressure tank from the surroundings when the pressure level has reached its set value $p_{T2}$.

* * * * *